United States Patent

Cuevas

[11] Patent Number: 5,902,010
[45] Date of Patent: May 11, 1999

[54] VEHICLE OCCUPANT RESTRAINT APPARATUS

[75] Inventor: Jess A. Cuevas, Scottsdale, Ariz.

[73] Assignee: TRW Inc., Lyndhurst, Ohio

[21] Appl. No.: 09/102,145

[22] Filed: Jun. 22, 1998

[51] Int. Cl.⁶ .................................................. B60N 2/42
[52] U.S. Cl. .............. 297/216.13; 297/488; 297/DIG. 8; 280/734; 280/730.1
[58] Field of Search .......................... 297/216.1, 216.13, 297/216.14, 284.1, 284.2, 284.6, DIG. 8, 452.41, 488; 280/751, 753, 730.1, 728.1, 734

[56] References Cited

U.S. PATENT DOCUMENTS

| | | |
|---|---|---|
| 3,370,886 | 2/1968 | Frost . |
| 3,603,535 | 9/1971 | DePolo . |
| 3,650,223 | 3/1972 | Kobori . |
| 3,733,091 | 5/1973 | Fleck et al. . |
| 3,877,749 | 4/1975 | Sakurai et al. ........................ 297/488 |
| 4,139,235 | 2/1979 | Elbert . |
| 4,655,505 | 4/1987 | Kashiwamura et al. . |
| 4,685,727 | 8/1987 | Cremer et al. . |
| 4,722,550 | 2/1988 | Imaoka et al. .......................... 280/734 |
| 4,765,569 | 8/1988 | Higgins . |
| 4,915,124 | 4/1990 | Sember, III . |
| 5,669,661 | 9/1997 | Pajon . |
| 5,782,529 | 7/1998 | Miller, III et al. .................. 297/216.13 |

FOREIGN PATENT DOCUMENTS 6278513  10/1994  Japan ................................. 297/216.13

*Primary Examiner*—Laurie K. Cranmer
*Attorney, Agent, or Firm*—Tarolli, Sundheim, Covell, Tummino & Szabo

[57] ABSTRACT

An apparatus (10) includes a vehicle seat back (26) having front and rear sides (40, 42). A bladder (50) is arranged between the front and rear sides (40, 42) of the seat back (26) in a deployed condition from which is it substantially inextendible by internal fluid pressure forces. The bladder (50) is contractible from the deployed condition by forces applied to the rear side (42) of the seat back (26) by a vehicle occupant moving behind the seat back (26) under ordinary vehicle operating conditions. The apparatus (10) responds to a crash-indicating condition by providing the bladder (50) with an elevated internal fluid pressure. The bladder (50) then provides a fluid pressure force for restraining forward movement of the vehicle occupant against the rear side (42) of the seat back (26) under the influence of a vehicle crash force.

5 Claims, 2 Drawing Sheets

1

VEHICLE OCCUPANT RESTRAINT APPARATUS

FIELD OF THE INVENTION

The present invention relates to an apparatus for restraining an occupant of a vehicle upon the occurrence of a vehicle crash.

BACKGROUND OF THE INVENTION

Vehicle crash forces may tend to move an occupant of a vehicle seat off the seat. Such crash forces may cause an occupant of a rear seat to move forward against the rear of an adjacent front seat.

SUMMARY OF THE INVENTION

In accordance with the present invention, an apparatus comprises a vehicle seat back with front and rear sides. A bladder is arranged between the front and rear sides of the seat back in a deployed condition from which is it substantially inextendible by internal fluid pressure forces. The bladder is contractible from the deployed condition by forces applied to the rear side of the seat back by a vehicle occupant moving behind the seat back under ordinary vehicle operating conditions. The apparatus further comprises means for responding to a crash-indicating condition by providing the bladder with an elevated internal fluid pressure. The bladder then provides a fluid pressure force for restraining forward movement of the vehicle occupant against the rear side of the seat back under the influence of a vehicle crash force.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
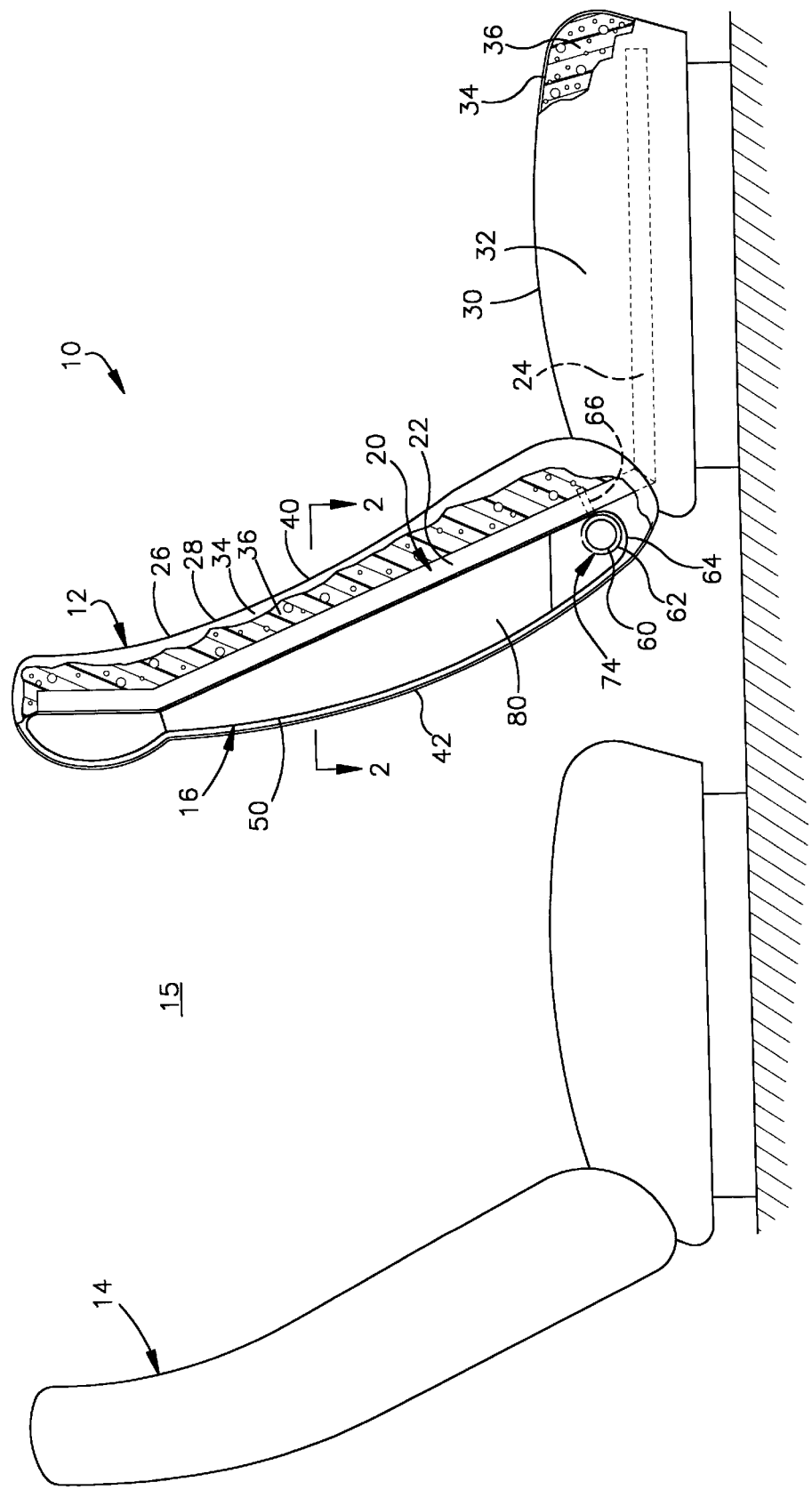
FIG. 1 is a side view of an apparatus comprising a preferred embodiment of the present invention, with certain parts being shown schematically.

An apparatus 10 comprising a preferred embodiment of the present invention is shown partially in FIG. 1. The apparatus 10 includes front and rear vehicle seats 12 and 14 in a vehicle occupant compartment 15. The apparatus 10 further includes a vehicle occupant restraint apparatus 16. The restraint apparatus 16 is mounted in the front seat 12 to restrain forward movement of an occupant of the rear seat 14.

The front seat 12 has a frame 20 with an upper section 22 and a lower section 24. A back portion 26 of the seat 12 is defined in part by the upper section 22 of the frame 20 and in part by a back cushion 28 which covers the upper section 22 of the frame 20. A bottom portion 30 of the seat 12 is similarly defined by the lower section 24 of the frame 20 and in part by a bottom cushion 32 which covers the lower section 24 of the frame 20. Each of the cushions 28 and 32 is a deflectable structure comprising an outer layer 34 on a compressible base 36. The outer layers 34 are preferably formed of fabric or leather. The bases 36 are preferably formed of elastomeric foam.

The back cushion 28 has opposite side surfaces 40 and 42 respectively defining the front and rear sides of the seat back 26. The upper section 22 of the frame 20 includes a spring assembly 44 (FIG. 2) for bearing weight loads or other forces applied to the seat back 26 by an occupant of the front seat 12. Such a spring assembly may comprise an array of horizontally or vertically extending wire springs, as known in the art. The base 36 of the back cushion 28 extends across the width and throughout the height of the seat back 26 between the spring assembly 44 and the outer layer 34 at the front side 40 of the seat back 26. In this arrangement, the base 36 of the back cushion 28 is compressively deflectable under the influence of loads applied to the seat back 26 by an occupant of the seat 12.

The restraint apparatus 16 includes a bladder 50 and a source 60 (FIG. 1) of fluid for pressurizing the bladder 50. The bladder 50 extends across the width and throughout the height of the seat back 26 between the spring structure 44 (FIG. 2) and the outer layer 34 at the rear side 42 of the seat back 26. The bladder 50 is thus arranged as a cushion for an occupant of the rear seat 14, and is effectively isolated from loads applied to the seat back 26 by an occupant of the front seat 12.

The source 60 of fluid in the preferred embodiment of the present invention is an inflator which is typically used as a source of inflation fluid for an air bag or other inflatable vehicle occupant protection device. As known in the art, such an inflator contains pressurized inflation fluid, a body of ignitable gas generating material, or a combination of pressurized inflation fluid and ignitable material for heating the inflation fluid. The inflator 60 and a surrounding diffuser 62 are contained in the bladder 50 adjacent to the lower end 64 of the bladder 50. A plurality of fasteners 66 (one of which is shown in FIG. 1) project from the diffuser 62 to the upper section 22 of the frame 20 to fasten the diffuser 62 and the inflator 60 to the frame 20.

Figure 4:
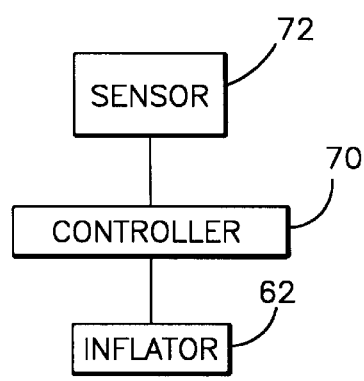
FIG. 4 is a block diagram of parts of the apparatus of FIG. 1.

As shown schematically in FIG. 4, other parts of the apparatus 10 include an electronic controller 70 and at least one crash sensor 72. The crash sensor 72 is a known device that senses vehicle conditions indicating the occurrence of a crash. Such a condition may meet or exceed a predetermined threshold level of severity for which use of the bladder 50 is desired to restrain forward movement of an occupant of the rear seat 14. If so, the controller 70 responds by actuating the inflator 60. The inflator 60 then emits a large quantity of inflation fluid.

An array of outlet openings 74 in the diffuser 62 direct the inflation fluid to flow upward from the inflator housing 60 into and throughout the volume of the bladder 50. This provides the bladder 50 with an elevated internal fluid pressure. The bladder 50 then provides a fluid pressure force for restraining forward movement of an occupant of the rear seat 14 when a vehicle crash force moves that occupant forward against the rear side 42 of the front seat 12. Importantly, the bladder 50 is normally arranged in the seat back 26 in a fully deployed condition from which it is substantially inextendible by internal fluid pressure forces. Therefore, the elevated internal fluid pressure imparts rigidity to the bladder 50, and hence the back cushion 28, at the rear side 42 of the seat back 26 without applying inflation reaction forces to the upper section 22 of the frame 20.

Figure 2:
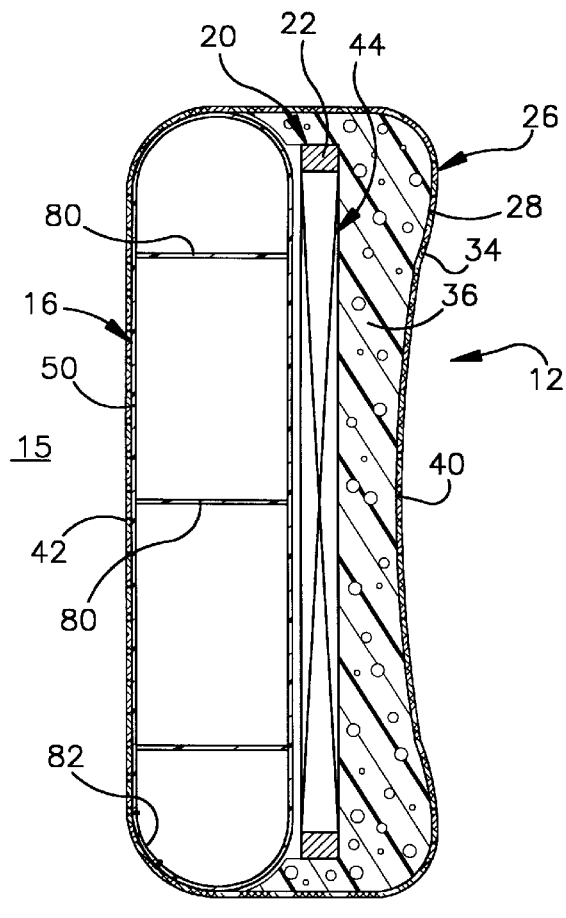
FIG. 2 is a view taken along line 2—2 of FIG. 1.
Figure 3:
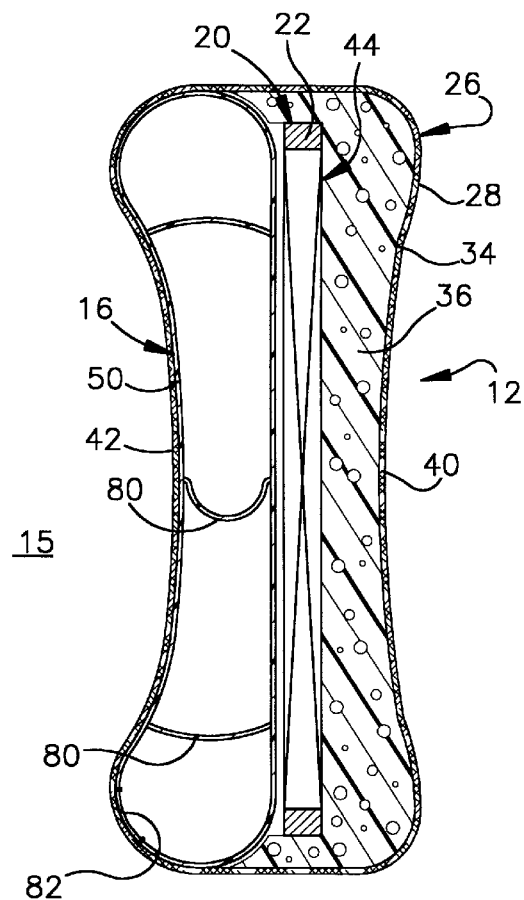
FIG. 3 is a view similar to FIG. 2 showing parts in different positions.

As best shown in FIG. 2, the bladder 50 has a plurality of horizontally spaced-apart, vertically elongated tether walls 80. The tether walls 80 are rigid enough to maintain the bladder 50 normally in its deployed condition, but are flexible enough for the bladder 50 to be compressively deflected under the influence of loads applied to the rear side 42 of the seat back 26 by an occupant of the rear seat 14, as indicated in FIG. 3. Such loads may be applied, for example, by the knees of an occupant of the back seat 14 during ordinary operating conditions of the vehicle, i.e., prior to actuation of the inflator 60 upon the occurrence of a crash. Any suitable vinyl or other flexible material may be used to provide the structure of the bladder 50 with such rigidity and flexibility. In accordance with this feature of the present invention, the bladder 50 is normally filled with air at the ambient atmospheric pressure. A blowout patch 82 is provided for fluid pressure relief. Alternatively, one or more peripheral portions of the bladder 50 may be permeable to the inflation fluid for fluid pressure relief.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a vehicle seat back having front and rear sides, said seat back including a bladder arranged between said front and rear sides in a deployed condition from which said bladder is substantially inextendible by internal fluid pressure forces, said bladder being contractible from said deployed condition by forces applied to said rear side of said seat back by a vehicle occupant moving behind said seat back under ordinary vehicle operating conditions; and means for responding to a crash-indicating condition by providing said bladder with an elevated internal fluid pressure, whereby said bladder provides a fluid pressure force for restraining forward movement of said vehicle occupant against said rear side of said seat back under the influence of a vehicle crash force.

2. Apparatus as defined in claim 1 wherein said seat back further includes a spring assembly which bears vehicle occupant weight loads applied to said front side of said seat back by an occupant of said seat, said bladder being located between said spring assembly and said rear side of said seat back, whereby said bladder is effectively isolated from said vehicle occupant weight loads.

3. Apparatus as defined in claim 2 wherein said seat back further includes a back cushion, said rear side of said seat back being defined by an outer layer of said back cushion.

4. Apparatus as defined in claim 2 wherein said bladder is filled with air at ambient atmospheric pressure.

5. Apparatus as defined in claim 2 wherein said bladder extends the full height of said rear side of said seat back.

* * * * *